(12) United States Patent
Chen et al.

(10) Patent No.: US 7,848,307 B2
(45) Date of Patent: Dec. 7, 2010

(54) METHOD AND APPARATUS TO ENFORCE AIRTIME QUOTA IN SERVICE INTERVAL IN A WIRELESS LAN

(75) Inventors: Richard Y. Chen, Croton-On-Hudson, NY (US); Ruediger Schmitt, Maplewood, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 664 days.

(21) Appl. No.: 11/813,913

(22) PCT Filed: Jan. 16, 2006

(86) PCT No.: PCT/IB2006/050151

§ 371 (c)(1),
(2), (4) Date: Jul. 13, 2007

(87) PCT Pub. No.: WO2006/077522

PCT Pub. Date: Jul. 27, 2006

(65) Prior Publication Data

US 2008/0144599 A1   Jun. 19, 2008

Related U.S. Application Data

(60) Provisional application No. 60/644,543, filed on Jan. 18, 2005.

(51) Int. Cl.
*H04J 3/24* (2006.01)
(52) U.S. Cl. ....................... 370/349; 370/351
(58) Field of Classification Search .............. 455/414.1, 455/423, 445, 452.2, 466; 370/252, 349, 370/351
See application file for complete search history.

(56) References Cited

U.S. PATENT DOCUMENTS

2003/0133427 A1   7/2003   Cimini

FOREIGN PATENT DOCUMENTS

| EP | 1227626 A2 | 7/2002 |
|---|---|---|
| WO | 2005011208 A1 | 2/2005 |

*Primary Examiner*—Sam Bhattacharya
(74) *Attorney, Agent, or Firm*—Larry Liberchuk

(57) ABSTRACT

Disclosed is a method and apparatus for managing transmission airtime in a wireless network communication system transmitting at least one data flow in a plurality of data packets (210) in service intervals (215). The method comprises the steps of determining an accumulated time of data packet transmissions in the service interval (215) for each of the data flows, determining an estimated time of the next data packet transmission in the service interval (215) for each of the data flows, and allowing the transmission of the next data packet (330) when the combined accumulated time and the estimated time for a flow to which the data packet belongs is less than a predetermined value (320).

39 Claims, 4 Drawing Sheets

METHOD AND APPARATUS TO ENFORCE AIRTIME QUOTA IN SERVICE INTERVAL IN A WIRELESS LAN

This application relates to wireless communications and, more particularly, to a method and apparatus for enforcing airtime quotas to improve quality of service (QoS).

IEEE 802.11 (WLAN) has gained a prevalent position both in business information technology (IT) and household consumer markets. Due to sharing broadband Internet access and thanks to easy deployment of WiFi technology, wireless home network has become a reality. However, real-time applications such as high quality audio/video (A/V) streaming and voice-over IP are lagging behind because there is a lack of a Quality-of-Service (QoS) support in the legacy 802.11 WLAN standards.

A wireless medium is by nature susceptible to external channel disturbances such as interference, distance, co-located wireless LANs operating in the same frequency band, line of sight and concurrent traffic overloading within the same WLAN network. As a result, a wireless link condition varies with both time and location. In addition, a common problem of "airtime unfairness" exists in legacy WLAN products. For example, when a wireless link in a WLAN network is going through a transition from a link of good quality to a link of bad quality due to these disturbances, there is an effect on the throughput of other good quality links in the same network segment as too much airtime is used in retransmission or by using a lower physical transmission rate. This results in lower throughput for the good wireless links. Hence, additional QoS support is needed for real-time applications to take off.

The generic approach for wireless QoS provisioning involves policing the airtime that a transmitter or a traffic flow takes during a specified time interval. The emerging QoS supplement to the legacy WLAN protocol, i.e., 802.11e, provides mechanisms for MAC QoS provisioning for wireless real-time applications that have contingent QoS requirements.

Existing mechanisms defined in 802.11e use the so-called transmission opportunity (TXOP) mechanism to realize QoS provisioning. TXOP is the airtime quota calculated from the traffic specification (TSPEC) for a traffic flow, an access category (AC) or a QoS-capable station (QSTA). However, enforcement of TXOP is up to individual vendors. As would be appreciated by those skilled in the art, the term "flow" referred to herein is applicable to a traffic flow, an access category or a QoS capable station.

Hence, there is a need in the industry for a method and system to monitor and enforce airtime allocations for outgoing traffic that completes the airfair MAC scheduler proposed to solve the airtime unfairness problem in 802.11e-enabled WANs.

In one aspect of the invention, managing transmission airtime in a wireless network communication system transmission of at least one data flow each containing a plurality of data packets in service intervals comprises the steps of determining an accumulated time of data packet transmissions in the service interval for each of the data flows, determining an estimated time of the next data packet transmission in the service interval for each of the data flows and allowing the transmission of the next data packet when the combined accumulated time and the estimated time associated with a flow to which the data packet belongs is less than a predetermined value.

In another aspect, a simplified version of the system may not include the step of estimating the transmission time for each packet. Or more specifically, the simplified system comprises the steps of determining an accumulated time of data packet transmissions in the service interval for each of the data flows, and allowing the transmission of the next data packet when the accumulated time associated with a flow to which the data packet belongs is less than a predetermined value. This simplified version can be considered as one aspect of the invention, in which the time estimate is always forced to be a zero value. Hence the discussion hereinafter on the inventions is applicable to both aspects.

Figure 1:
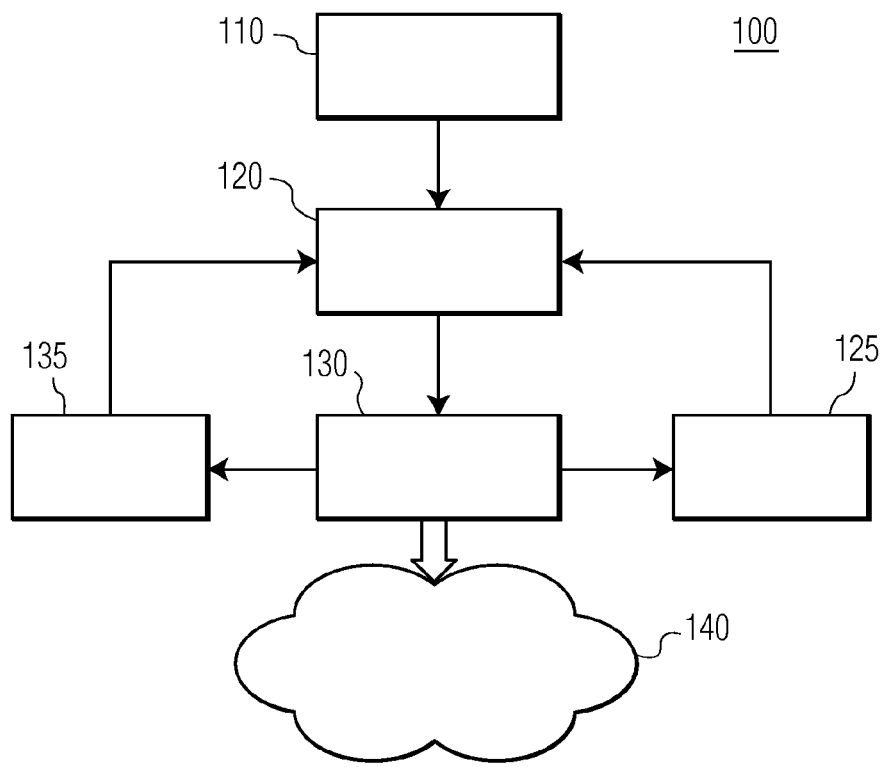
FIG. 1 illustrates an airtime policer in accordance with the principles of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

FIG. 1 illustrates an exemplary airtime policer system 100 in accordance with the principles of the invention. Queue-level scheduler 110 determines an accumulative TXOP for each flow or data stream (i) for the period of Service Interval (SI) according to the proposed method. This accumulative TXOP represents the airtime quota that needs to be enforced in each SI for a specific flow (i). Before the scheduler passes down to the transmitter a data packet associated with a specific flow (i), for transmission over the air, i.e., transmission media, the airtime scheduler needs to check whether the airtime quota associated with the flow (i) to which the packet belongs has been exhausted. If the airtime quota has not been exhausted, then the transmitter is permitted to send the packets to the wireless channel according to the 802.11 protocols, for example. In addition, the scheduler records the time used to transmit the packet after receiving an acknowledgement (ACK) from the station (STA) to which the packet was sent. This information is used in the estimator and flow status modules. The flow status module keeps track of airtime used by each flow (i) within the SI superframe by accumulating actual transmission time for every packet (p) of the flow (i) that has been transmitted during the SI. The estimator updates the estimation of the transmission time for the corresponding flow (i) after each successful transmission of a packet (p) using the method described more fully with regard to FIGS. 3a and 3b.

The queue-level scheduler is a generic module in WLAN products. In an 802.11e-enabled system, for example, the queue-level scheduler takes the traffic specification in the form of TSPEC passed down by applications and performs a desired traffic scheduling algorithm accordingly. Although a queue-level scheduler is shown and used to describe the present invention, it would be recognized by those skilled in the art that the queue-level scheduler shown is a generic representation of queue-level schedulers and the present invention may operate with a plurality of queue-level scheduler types and is not limited to the specific type shown herein.

The transmission airtime is known to depend on the packet size, the number of retries and access parameters in IEEE 802.11 protocol, such as inter-frame spacing and minimum and maximum contention window sizes as well as the physical layer (PHY) rate and traffic load condition. The transmission airtime can be estimated using the history of actual transmission times of transmitted packets that belong to the associated flow. An exemplary estimation algorithm may be represented as:

$$Ttx_i\_estimate(t)=(1-\alpha)Ttx_i\_estimate(t-1)+\alpha Ttx_i(p), \quad [1a]$$

where $Ttx_i\_estimate(t)$ is the estimate transmission time for flow (i) at
time t;
$\alpha$ is a value in the range 0-1.0; and
$Ttx_i(p)$ is the actual transmission time of the most recently
transmitted packet (p) that is contained in flow (i).

By adjusting the value of $\alpha$, an appropriate trade-off can be made between long-term trends and more spontaneous responses. Further, as the estimation is performed on a per-flow basis, the estimation model better reflects the inherent traffic model and actual link conditions.

In another aspect of the invention, the estimated time may be determined as a function of the history of the actual transmission time, where the function is a weighted sum of the transmission times for a number (n) of previously transmitted packets that belong to the associated flow. This may be represented as:

$$Ttx_i\_estimate(t) = \sum_{p=0}^{n-1} \alpha_p Ttx_i(p), \quad [1b]$$

where $\alpha_p$ is a value in 0-1.0;

In still another aspect of the invention, the estimated time may be determined as an average of the transmission times for a number (n) of previously transmitted packets that belong to the associated flow. As it would be recognized by those skilled in the art, an average value may be determined with regard to equation 1b, when $$Ttx_i\_estimate(t) = \frac{1}{n}\sum_{p=0}^{n-1} Ttx_i(p). \quad [1c]$$

In this case, the average value may be represented as:

$$\alpha_k = \frac{1}{n}.$$

In still another aspect of the invention, the estimate transmission time for flow (i) may be fixed at a zero value.

Figure 2:
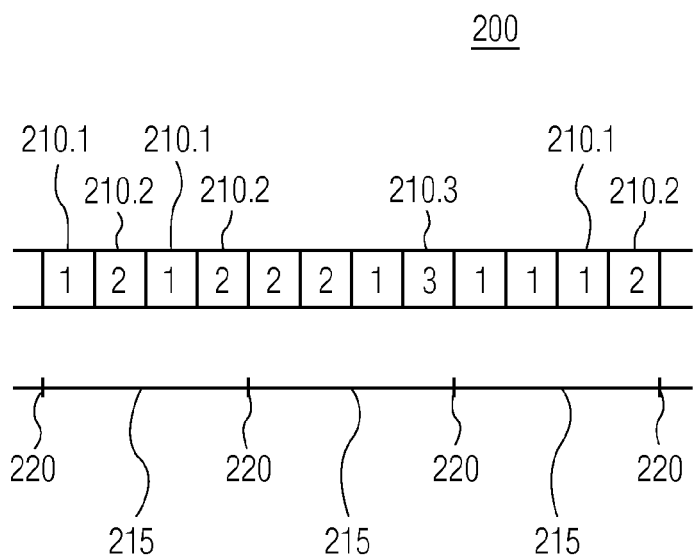
FIG. 2 illustrates an exemplary superframe transmission for implementing the airtime policer shown in FIG. 1.

FIG. 2 illustrates an exemplary packet transmission and SI superframe 215 illustrating the principles of the present invention. In this illustrative example, data packets 210.1, 210.2 and 21.03, which are associated with flows, 1, 2 and 3, respectively, are transmitted at a rate determined by scheduler 110 (FIG. 1), based on known scheduling algorithms. In this case, data packets transmitted in an order of packet 210.1, 210.2, 210.1, etc., when viewed left to right. Further shown is that at the beginning of each SI superframe 220, the accumulated transmission time, $Time_i\_consumed(t)$, is reset for each traffic flow (i). In one aspect, nominally this value is set to zero. For each packet transmission 210 within the superframe SI 215 the time-consumed is accumulated and updated for the flow (i) to which the transmitted packet belongs. Also updated is the estimate of transmission time for flow (i) to which the transmitted packet belongs.

$Ttx_i\_estimate(t)$ is reset to a nominal value specific to the physical layer (PHY) rate, whenever the PHY rate is changed, i.e., to adapt to channel conditions by a link adaptation algorithm running in the system.

Hence, after each packet (p) is transmitted successfully, an estimate of the transmission time for the flow (i) is updated as previously discussed.

Furthermore, the time_consumed for the flow (i), to which packet p belongs, is updated as:

$$Time_i\_consumed(t)=Time_i\_consumed(t-1)+T_{tx}(p), \quad [2]$$

where $T_{tx}(p_t)$ is the airtime that packet p took to transmit for the flow (i).

When the combined accumulated time of actual transmissions as determined by equation 2, and the current estimate of transmission time for flow (i) exceed a predetermined value, then the current packet associated with the flow (i) in consideration is not transmitted.

Figure 3A:
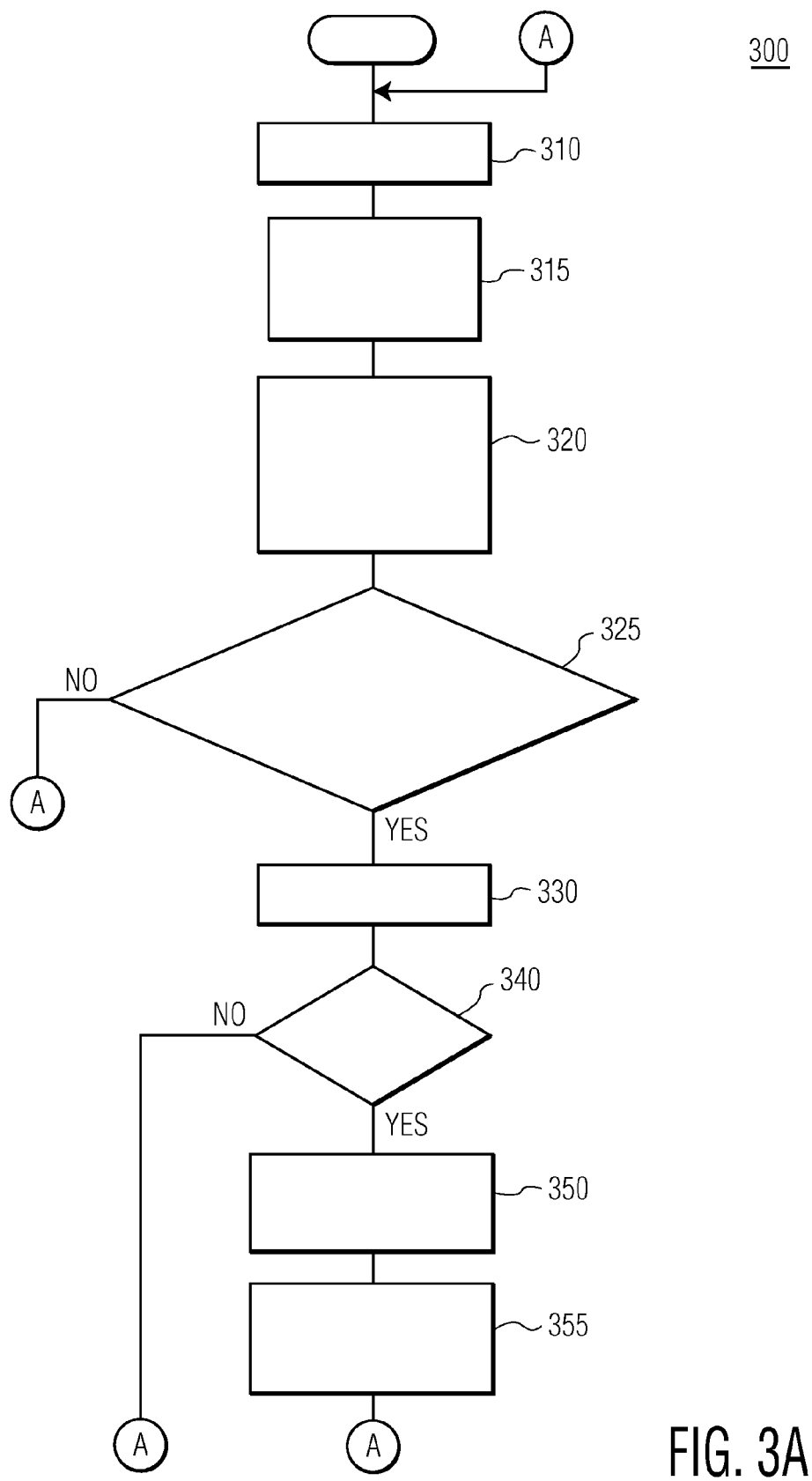
FIGS. 3a and 3b illustrate flow charts for executing the exemplary processing shown herein.

FIG. 3a illustrates a flow chart of an exemplary process 300 for managing airtime in accordance with the principles of the present invention. In this exemplary process, the next packet for transmission is obtained at block 310. At block 315, the flow (i) associated with the next packet is obtained or determined. At bock 320, current estimate of transmission time, $Ttx_i\_estimate(t)$, and accumulated transmission time for flow (i) associated with the next packet are obtained At block 325, a determination is made whether the accumulated time of transmission and the estimate of transmission time associated with the obtained flow (i) is less than a predetermined value. This is more specifically expressed as:

$$Time_i\_consumed(t)+Ttx_i\_estimate(t)<TxOP\_S_i \quad [3]$$

If the answer is in the affirmative, then the next data packet is transmitted at block 330 and processing proceeds to block 340, where a determination is made whether the transmission was successful. If the answer is in the affirmative, then at block 350 the time consumed for the transmission of the packet is updated in accordance with equation 2. And at bock 355, time estimate, $Ttx_i\_estimate(t)$, is updated based on the most recently transmitted packet (p) that belongs to flow (i), as is previously discussed, i.e., equations 1a, 1b, 1c or set to 0. Processing proceeds to block 310 to obtain the next packet. However, if the answer at block 340 is negative, then the next packet is obtained at block 310.

Figure 3B:
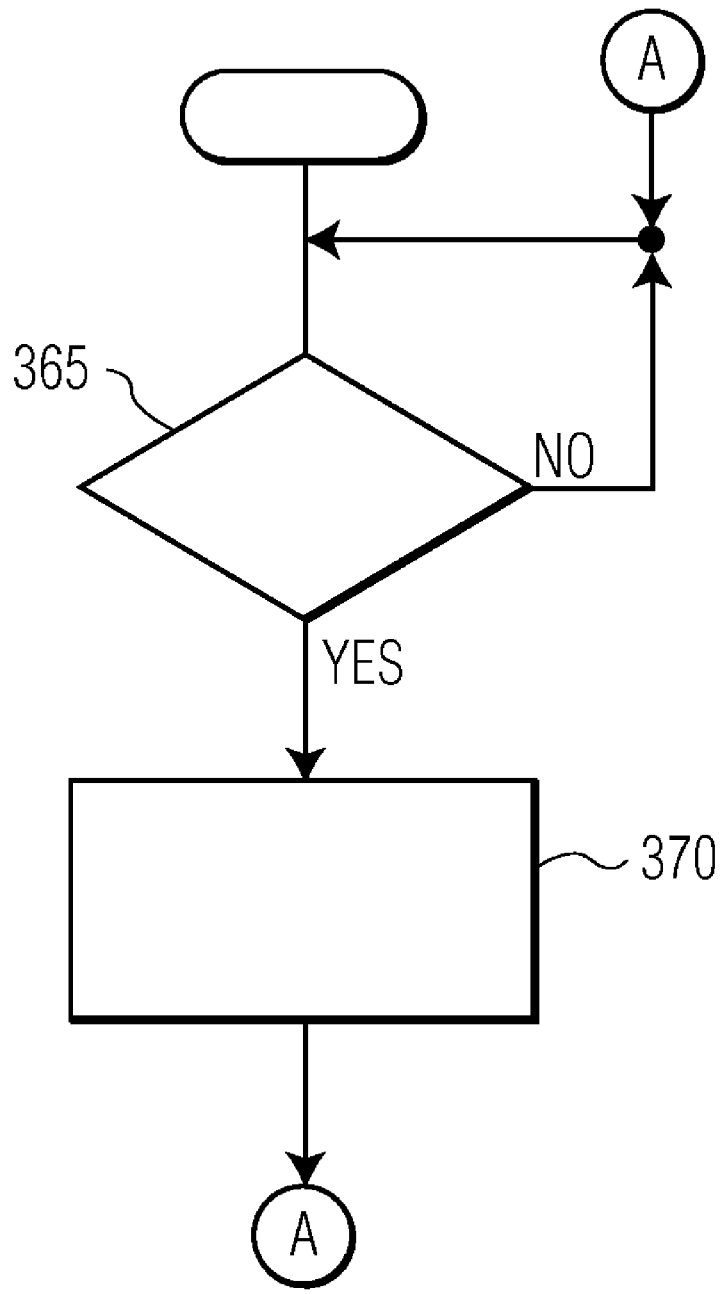

FIG. 3b illustrates a flow chart of another exemplary process 360 for managing airtime in accordance with the principles of the invention. In this exemplary process, a determination is made, at block 365, whether the SI superframe has expired. If the answer is negative, then processing continues to monitor the expiration of an SI superframe. However, if the answer is in the affirmative, then the accumulated time consumed for transmission for each flow (i) is reset at block 370. Processing then proceeds to block 365 to continue monitoring the expiration of the SI superframe. As one skilled in the art would recognize, the expiration of an SI superframe may occur after a known time period has expired. Other methods may also be employed to indicate the expiration of the SI superframe. In one aspect of the invention, the expiration of an SI superframe may occur when an event, such as an interrupt or trap is detected. Such an interrupt may provide an indication that is monitored and its presence indicates the expiration of the SI superframe. In another aspect, the difference between a current time and a prior time may be made and when the difference exceeds a known value, an indication of such an occurrence may be made. This indication may then be monitored.

Figure 4:
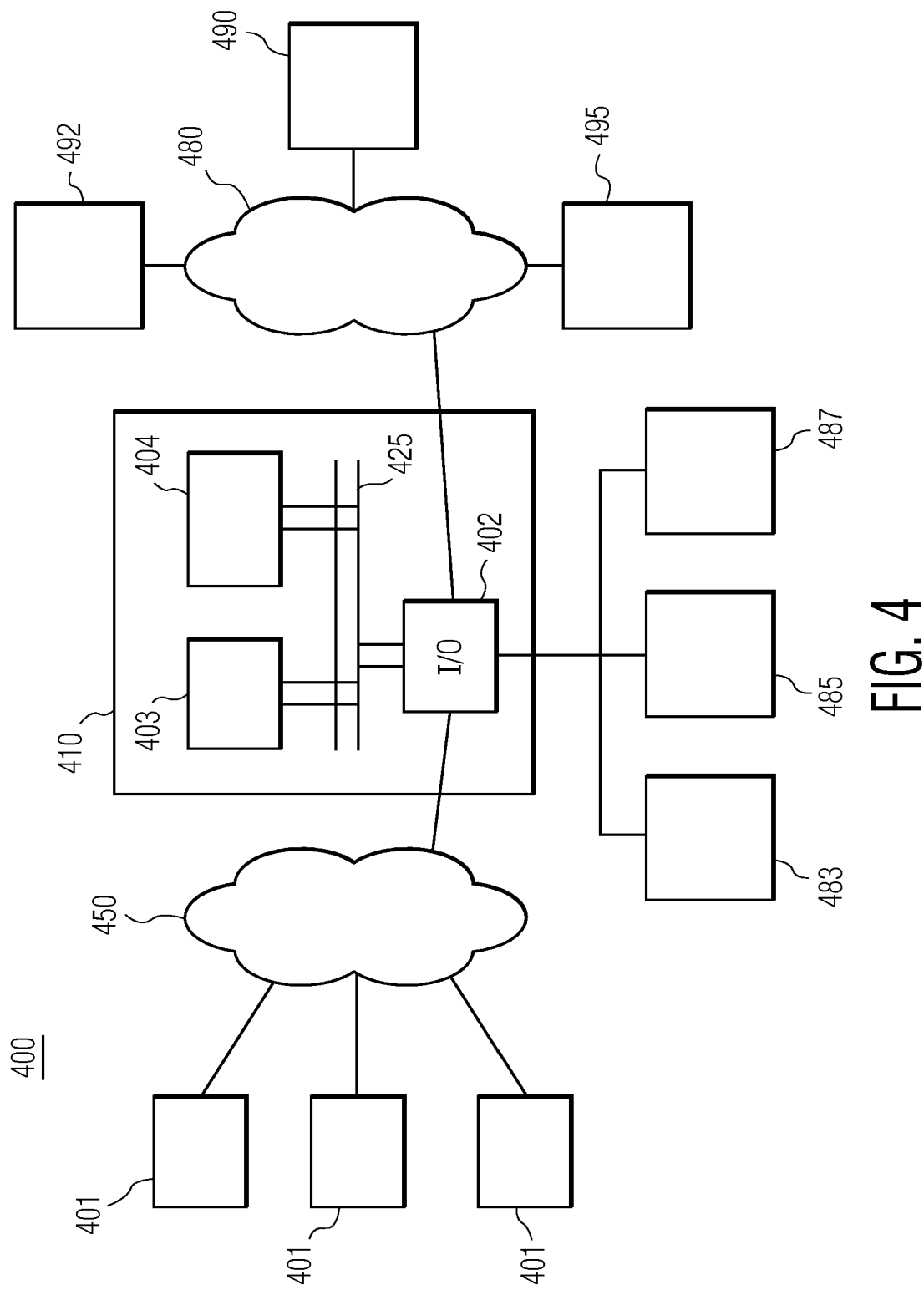
FIG. 4 illustrates a system for executing the processing shown herein.

FIG. 4 illustrates an exemplary embodiment of a system 400 that may be used for implementing the principles of the present invention. System 400 may contain one or more input/output devices 402, processors 403 and memories 404. I/O devices 402 may access or receive information from one or more sources 401. Client devices 401 may be devices such as computers, notebook computers, PDAs, cells phones or other devices suitable for providing information to execute the processing shown herein. Devices 401 may access one or more network connections 450 via, for example, a wireless wide area network, a wireless metropolitan area network, a wireless local area network, a terrestrial broadcast system (Radio, TV), a satellite network, a cell phone, or a wireless telephone network, as well as portions or combinations of these and other types of networks.

Input/output devices 402, processors 403 and memories 404 may communicate over a communication medium 425. Communication medium 425 may represent, for example, a bus, a communication network, one or more internal connections of a circuit, circuit card or other apparatus, as well as portions and combinations of these and other communication media. Input data from the client devices 401 is processed in accordance with one or more programs that may be stored in memories 404 and executed by processors 403. Processors 403 may be any means, such as a general-purpose or special-purpose computing system, or may be a hardware configuration, such as a laptop computer, desktop computer, a server, handheld computer, dedicated logic circuit, or integrated circuit. Processors 403 may also be Programmable Array Logic (PAL), Application Specific Integrated Circuit (ASIC), etc., which may be hardware "programmed" to include software instructions or a code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing a hardware executable code. Memories 404 may be any semiconductor memory such as PROM, EPROM, EEPROM or RAM that is external to processor 403, and/or may be integrated with processor 403, e.g., a cache.

In one aspect, the principles of the present invention may be implemented by a computer-readable code executed by processor 403. The code may be stored in the memory 404 or read/downloaded from a memory medium 483, an I/O device 485 or magnetic, optical media such as a floppy disk, a CD-ROM or a DVD 487.

Information items from device 401 received by I/O device 402 after processing in accordance with one or more software programs operable to perform the functions illustrated herein may also be transmitted over network 480 to one or more output devices represented as reporting device 490, display 492, or second processing system 495.

As one skilled in the art would recognize, the term "computer" or "computer system" may represent one or more processing units in communication with one or more memory units and other devices, e.g., peripherals, connected electronically to and communicating with at least one processing unit. Furthermore, the devices may be electronically connected to one or more processing units via internal buses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and noted fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A method for managing the transmission airtime in a wireless network communication system transmitting at least one data flow containing a plurality of data packets in service intervals, comprising:

determining, for each of the at least one data flow, an accumulated time of data packet transmission in the service interval in which the transmission occurs;

determining an estimated time of a next data packet transmission in the service interval for each of the at least one data flow; and allowing the transmission of the next data packet when a sum of the accumulated time and the estimated time associated with a data flow to which the next data packet belongs is less than a predetermined value.

2. The method as recited in claim 1, wherein determining the accumulated time of data packet transmission for each data flow further comprises: accumulating actual times of data packet transmission in the service interval for each data flow.

3. The method as recited in claim 1, wherein the accumulated time of data packet transmission for each data flow is initialized at the beginning of each service interval.

4. The method as recited in claim 1, wherein the estimated time is reset to a nominal value, whenever a physical layer rate is changed.

5. The method as recited in claim 1, wherein the estimated time for each of the at least one data flows is based on a history of actual data packet transmission times associated with a corresponding data flow.

6. The method as recited in claim 5, wherein the estimated time for an associated flow is further based on an average value of data packet transmission times associated with the corresponding data flow.

7. The method as recited in claim 5, wherein the estimated time for an associated flow is further based on a weighted sum of data packet transmission times associated with the data flow.

8. The method as recited in claim 5, wherein determining the estimated time further comprises combining a predetermined percentage of an actual data packet transmission time with a predetermined percentage of a prior estimated time associated with a corresponding data flow.

9. The method as recited in claim 8, wherein the predetermined percentages are related.

10. The method as recited in claim 1, wherein determining the estimated time further comprises the step of setting said estimated time to a zero value.

11. The method as recited in claim 1, wherein the predetermined value is an airtime quota determined from at least one of a data flow, an access category, and quality of service capable station.

12. The method as recited in claim 11, wherein the airtime quota is determined from a traffic specification.

13. An apparatus for managing the transmission airtime in a wireless network communication system transmitting at least one data flow containing a plurality of data packets in service intervals, comprising:
   a processor in communication with a memory for storing a code, the processor executing the code for:
   determining, for each of the at least one data flow, an accumulated
   time of data packet transmissions in the service interval in which the transmissions occur;
   determining an estimated time of a next data packet transmission in the service interval for each of the at least one data flow; and
   allowing the transmission of the next data packet when a sum of the accumulated time of data packet transmission and the estimate of a next data packet transmission associated with a data flow to which the packet belongs is less than a predetermined value.

14. The apparatus as recited in claim 13, wherein the accumulated time is an accumulation of actual times of data packet transmissions in the service interval for each associated data flow.

15. The apparatus as recited in claim 13, wherein the accumulated time of data packet transmission for each data flow is initialized at the beginning of each service interval.

16. The apparatus as recited in claim 13, wherein the estimated time is reset to a nominal value, whenever the physical layer rate is changed.

17. The apparatus as recited in claim 13, wherein the estimated time for each of the at least one data flows is based on a history of actual data packet transmission times associated with a corresponding data flow.

18. The apparatus as recited in claim 17, wherein the estimated time for corresponding data flow is further based on an average value of data packet transmission times associated with the data flow.

19. The apparatus as recited in claim 18, wherein determining the estimated time for a data flow is further based on a weighted sum of data packet transmission times associated with the data flow.

20. The apparatus as recited in claim 17, wherein determining the estimated time for a data flow further comprising combining a predetermined percentage of an actual data packet transmission time with a predetermined percentage of a prior estimated time associated with a corresponding data flow.

21. The apparatus as recited in claim 20, wherein the predetermined percentages are related.

22. The apparatus as recited in claim 13, wherein the step of determining an estimated time comprises setting said estimated time to a zero value.

23. The apparatus as recited in claim 13, wherein the predetermined value is determined to achieve a desired quality of service (QoS).

24. The apparatus as recited in claim 13, wherein the predetermined value is at least one of an airtime quota based on a data flow, an access category, and a QoS capable station.

25. The apparatus as recited in claim 24, wherein the airtime quota is determined from a traffic specification.

26. The apparatus as recited in claim 13, further comprising an input/output device in communication with the processor.

27. A method for managing the transmission airtime in a wireless network communication system transmitting at least one data flow containing a plurality of data packets in service intervals, comprising:
   determining, for each of the at least one data flow, an accumulated time of data packet transmission in the service interval in which the transmission occurs; and
   allowing the transmission of the next data packet when the accumulated time associated with a data flow to which the next data packet belongs is less than a predetermined value.

28. The method as recited in claim 24, wherein determining the accumulated time of data packet transmission comprises accumulating actual times of data packet transmission in the service interval for each associated data flow.

29. The method as recited in claim 27, wherein the accumulated time of data packet transmission for each data flow is initialized at the beginning of each service interval.

30. The method as recited in claim 27, wherein the predetermined value is determined to achieve a desired quality of service (QoS).

31. The method as recited in claim 27, wherein the predetermined value is an airtime quota determined for at least one of a data flow, an access category, and QoS capable station.

32. The method as recited in claim 27, wherein the airtime quota is determined from a traffic specification.

33. An apparatus for managing a transmission airtime in a wireless network communication system, comprising
   a flow status module for tracking of airtime used by each data flow within the service superframe by accumulating actual transmission time for every packet of each data flow that has been transmitted during the service interval;
   an estimator for determining estimated time of a next data packet transmission in the service interval for each data flow; and
   a queue-level scheduler for determining an airtime quota that to be enforced in each service interval for each of at least one data flow, based on the accumulated time and estimated time.

34. The apparatus as recited in claim 33, wherein the queue-level scheduler further records the time used to transmit the packet of a specific data flow after receiving an acknowledgement (ACK) from the station to which the packet was sent.

35. The apparatus as recited in claim 33, wherein the queue-level scheduler allows the transmission of the next data packet when a sum of the estimated time and the accumulated time of data packet transmission associated with the data flow to which the packet belongs is less than a predetermined value.

36. The apparatus as recited in claim 35, wherein the predetermined value is determined to achieve a desired quality of service (QoS).

37. The apparatus as recited in claim 35, wherein the predetermined value is at least one of an airtime quota based on a data flow, an access category, and QoS capable station.

38. The apparatus as recited in claim 33, wherein the airtime quota is determined from a traffic specification.

39. The apparatus as recited in claim 33, wherein the accumulated time of data packet transmission for each data flow is initialized at the beginning of each service interval.

* * * * *